(12) United States Patent
Kitamura (10) Patent No.: US 7,231,503 B2
(45) Date of Patent: Jun. 12, 2007

(54) RECONFIGURING LOGICAL SETTINGS IN A STORAGE SYSTEM

(75) Inventor: Manabu Kitamura, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 61 days.

(21) Appl. No.: 10/845,289

(22) Filed: May 12, 2004

(65) Prior Publication Data

US 2005/0268043 A1 Dec. 1, 2005

(51) Int. Cl.
*G06F 12/02* (2006.01)

(52) U.S. Cl. .................. 711/165; 711/148; 711/152; 370/216; 370/217; 370/223; 370/227; 709/221; 709/226; 709/223; 709/224; 709/239; 714/25; 714/30

(58) Field of Classification Search ............. 370/248, 370/389, 216–217, 223, 227; 709/226, 221, 709/239, 223–224; 711/148, 152, 165; 714/25, 714/30
See application file for complete search history.

(56) References Cited

U.S. PATENT DOCUMENTS

| | | | |
|---|---|---|---|
| 5,613,073 A * | 3/1997 | Hammond et al. ......... | 709/226 |
| 5,918,016 A | 6/1999 | Brewer et al. | |
| 6,195,706 B1 | 2/2001 | Scott | |
| 6,208,616 B1 * | 3/2001 | Mahalingam et al. ....... | 370/216 |
| 6,260,120 B1 * | 7/2001 | Blumenau et al. .......... | 711/152 |
| 6,272,113 B1 * | 8/2001 | McIntyre et al. ........... | 370/248 |
| 6,647,509 B2 | 11/2003 | Ichinohe et al. | |
| 6,775,230 B1 | 8/2004 | Watanabe et al. | |
| 2002/0156984 A1 * | 10/2002 | Padovano ................... | 711/148 |
| 2002/0166033 A1 * | 11/2002 | Kagami et al. ............. | 711/148 |
| 2002/0191602 A1 * | 12/2002 | Woodring et al. .......... | 370/389 |
| 2004/0148380 A1 | 7/2004 | Meyer et al. | |

OTHER PUBLICATIONS

R. Droms, Dynamic Host Configuration Protocol, Bucknell University, Mar. 1997, 45 pages, Network Working Group.

* cited by examiner

*Primary Examiner*—Pierre Bataille
*Assistant Examiner*—Hetul Patel
(74) *Attorney, Agent, or Firm*—Townsend and Townsend and Crew LLP (57) ABSTRACT

A storage system having multiple I/O interface ports is configured to detect a failed communication condition at a port. The storage system is configured to then attempt communication using a port configuration of another port that also exhibits a failed communication condition. If communication is established, the port is reconfigured using the configuration of the other port.

22 Claims, 9 Drawing Sheets

| NODE 201 | PORT 202 | IP Address 203 | NetMask 204 | Gateway 205 | DEV 206 | Status 207 |
|---|---|---|---|---|---|---|
| 1 | 1 | 152.98.2.15 | 255.255.0.0 | 152.98.2.2 | 0, 1 | NG |
| 2 | 2 | 133.144.10.20 | 255.255.0.0 | 133.144.10.1 | 10, 11 | NG |
| 3 | 3 | 133.144.10.11 | 255.255.0.0 | 133.144.10.1 | 101, 102 | OK |
| 4 | 4 | 152.98.2.22 | 255.255.0.0 | 152.98.2.2 | 202, 203 | OK |
| ... | ... | ... | ... | ... | ... | ... |
| N | N | 192.168.2.13 | 255.255.255.192 | 192.168.2.1 | 32 | OK |

| NODE 201 | PORT 202 | IP Address 203 | NetMask 204 | Gateway 205 | DEV 206 | Status 207 |
|---|---|---|---|---|---|---|
| 1 | 1 | 133.144.10.20 | 255.255.0.0 | 133.144.10.1 | 10, 11 | OK |
| 2 | 2 | 152.98.2.15 | 255.255.0.0 | 152.98.2.2 | 0, 1 | OK |
| 3 | 3 | 133.144.10.11 | 255.255.0.0 | 133.144.10.1 | 101, 102 | OK |
| 4 | 4 | 152.98.2.22 | 255.255.0.0 | 152.98.2.2 | 202, 203 | OK |
| ... | ... | ... | ... | ... | ... | ... |
| N | N | 192.168.2.13 | 255.255.255.192 | 192.168.2.1 | 32 | OK |

| | 201 | 202 | 203 | 204 | 205 | 207 |
|---|---|---|---|---|---|---|
| | NODE | PORT | IP Address | NetMask | Gateway | Status |
| | 1 | 1 | 152.98.2.15 | 255.255.0.0 | 152.98.2.2 | NG |
| | 2 | 2 | 133.144.10.20 | 255.255.0.0 | 133.144.10.1 | NG |
| | 3 | 3 | 133.144.10.11 | 255.255.0.0 | 133.144.10.1 | OK |
| | 4 | 4 | 152.98.2.22 | 255.255.0.0 | 152.98.2.2 | OK |
| | ... | ... | ... | ... | ... | ... |
| | N | N | 192.168.2.13 | 255.255.255.192 | 192.168.2.1 | OK |

| 601 | 602 | 603 | 604 | 605 | 606 |
|---|---|---|---|---|---|
| ZONE | NODE | F-PORT | DEV-WWN | LUN | DEV-PORT |
| 1 | 1 | 1 | 10:04:e2:04:48:39 | 0 | 4 |
| 1 | 1 | 1 | 10:04:e2:04:48:39 | 1 | 4 |
| 2 | 2 | 2 | 00:21:a2:31:22:b6 | 0 | 5 |
| 3 | 3 | .... | .... | ... | ... |
| | | | | | |
| N | N | | | | |

RECONFIGURING LOGICAL SETTINGS IN A STORAGE SYSTEM

BACKGROUND OF THE INVENTION

The present invention relates to storage systems, and in particular to the automation of storage system settings, including configurations in which the storage system is connected to multiple networks.

Due to recent trends in data consolidation, storage systems in large enterprises and midrange storage systems are being configured with increasingly large numbers of input/output (I/O) ports. Large storage systems can provide on the order to tens of I/O ports. These large numbers of ports provide high connectivity to the many host computers that can be found in most working environments, be they businesses, educational facilities, hospitals, and so on.

A variety of physical connection schemes have been implemented over time. Host computers can be connected directly to an I/O port on the storage system. Some of the I/O ports can be connected to a communication network, allowing host computers that have access on the network to the storage device via the network. Such networks include local area networks (LANs), wide area networks (WANs), and the like. Typically, the storage system is connected to a switching apparatus such as a router, or a gateway, or the like. In addition to physical connection methods (referred to as "wired" connections), technology exists which can provide host devices with connection to a storage system over a "wireless" connection.

In the case of "wired" connections to the storage system, one end of a cable is physically attached to a suitably configured port and the other end connects to a host computer or to a switch that is connected to a communication network.

As typical examples, storage systems can be connected to host computers via SCSI (Small Computer Systems Interface) connections. Physical connection can be made using Ethernet or a Fibre Channel (FC) switch. These interfaces (data communication methods) allow users, such as a system administrator, to locate a host computer at a location that is physically remote from the storage systems.

A consequence of the physical cabling is that numerous connections between the many ports on the storage system to host computers and/or switches can become difficult to manage. It is easy to for cables to be accidentally cross-connected, and difficult to troubleshoot accidental cross-connections. This is a problem looking for a solution.

SUMMARY OF THE INVENTION

In accordance with the present invention, a storage system having multiple I/O interface ports is provided. The storage system can detect failed communication conditions at its ports (failed ports). The storage system can attempt to reconfigure failed ports using the port configuration of another failed port.

BRIEF DESCRIPTION OF THE DRAWINGS

Aspects, advantages and novel features of the present invention will become apparent from the following description of the invention presented in conjunction with the accompanying drawings, wherein.

DESCRIPTION OF THE SPECIFIC EMBODIMENTS

Figure 1:
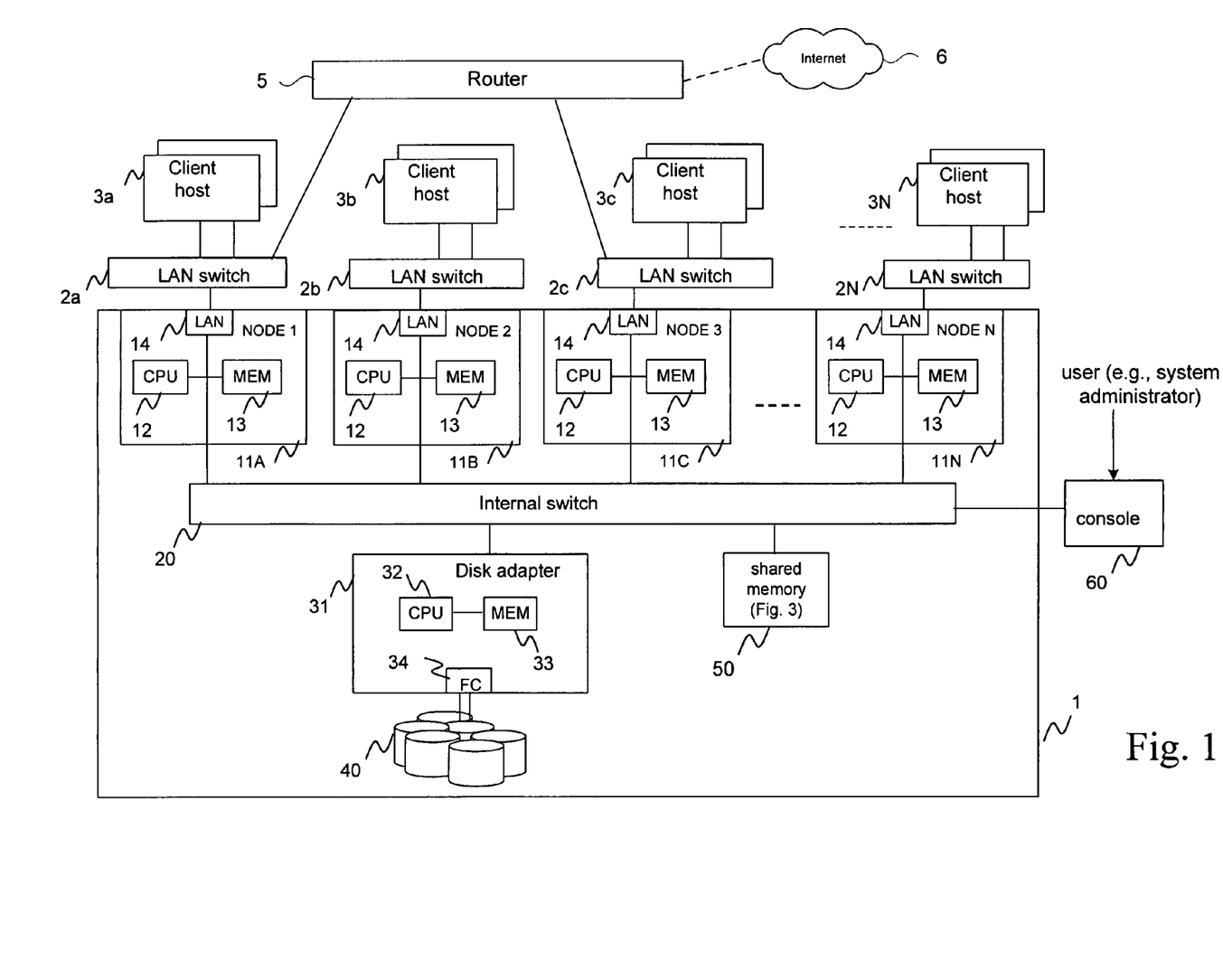
FIG. 1 is a block diagram showing a configuration of a storage system to which an embodiment of the present invention is applied.

FIG. 1 is a high level block diagram of a typical embodiment of a storage system 1. The storage system shown includes a plurality of host adapters (HAs) 11a to 11N. Each host adapter (generically identified by reference numeral 11) comprises a data processing component (e.g., CPU 12), a memory component 13, and a port 14 (e.g., a LAN interface port). Shown in each HA 11 is a suitable internal bus configured to operably connect together these components, and is understood to include data buses, control lines, power supply lines, and so on. In the embodiment shown in FIG. 1, the ports of the storage system 1 comprise the ports 14 from the HAs 11a to 11N.

Continuing with FIG. 1, the storage system 1 includes an internal switch apparatus 20. As can be seen, the internal bus in each HA 11 includes a connection to the internal switch apparatus 20. A disk adapter 31 is connected to the internal switch apparatus 20. The disk adapter 31 comprises a data processing unit (e.g., CPU 32), a memory component 33, and a fibre channel (FC) interface 34 that is connected to physical storage units 40. The figure shows that the disk adapter 31 includes an internal bus configured to operably connect together these components, and is understood to include data buses, control lines, power supply lines, and so on.

A shared memory 50 is connected to the internal switch apparatus 20. The shared memory 50 is used to store control and related information for the HAs 11 and the disk adapter 31. Data that is written and read is also stored in the shared memory 50. The shared memory component shown in FIG. 1 can comprise one or more physical memory components, such as DRAM (dynamic random access memory), SRAM (static random access memory), and so on.

The internal switch apparatus 20 coordinates the routing of data between the HAs 11a to 11N and the disk adapter 31, and coordinates access between the system console 60 and the various internal components of the storage system 1. The internal switch apparatus 20 can be a bus structure, with suitable control logic to coordinate the movement of data.

The ports of the storage system 1 connect to various external devices. FIG. 1 shows the ports are connected to LAN switches 2a to 2N (generically referenced by reference numeral 2). FIG. 1 shows client hosts 3a to 3N in data communication with the storage system 1 by way of the LAN switches 2a to 2N. A client host 3 can be any data processing unit that issues I/O requests to be serviced by the storage system 1, perform a read operation on data stored in the physical storage units 40 or to perform a write operation of data to the physical storage units 40.

The disk adapter 31 receives I/O requests from the client hosts 3 by way the HAs 11a to 11N via the internal switch 20. The disk adapter 31 services the I/O requests by accessing the physical storage units 40. The disk adapter 31 can also operate to present the physical storage units 40 as one or more logical disks or logical volumes (logical devices), so that the client hosts 3a to 3N "see" only the logical devices. Although only one disk adapter is shown in the figure, one of ordinary skill will appreciate that other storage system configurations can include one or more additional disk adapters.

To complete the description of FIG. 1, the storage system 1 typically includes a system console 60, and can be any suitable data processing apparatus. The system console 60 allows a user (e.g., system administrator) to access various parts of the storage system 1. For example, configuration information of the storage system 1 can be defined, viewed, and otherwise maintained via the system console 60. System activity and other activity in the storage system 1 can be monitored from the system console 60. The figure shows the system console 60 to be a device that is physically connected to the internal switch 20, via a suitable external connector. However, it can be appreciated that the functionality of the system console 60 can be accessed via network connection as well.

Figure 2:
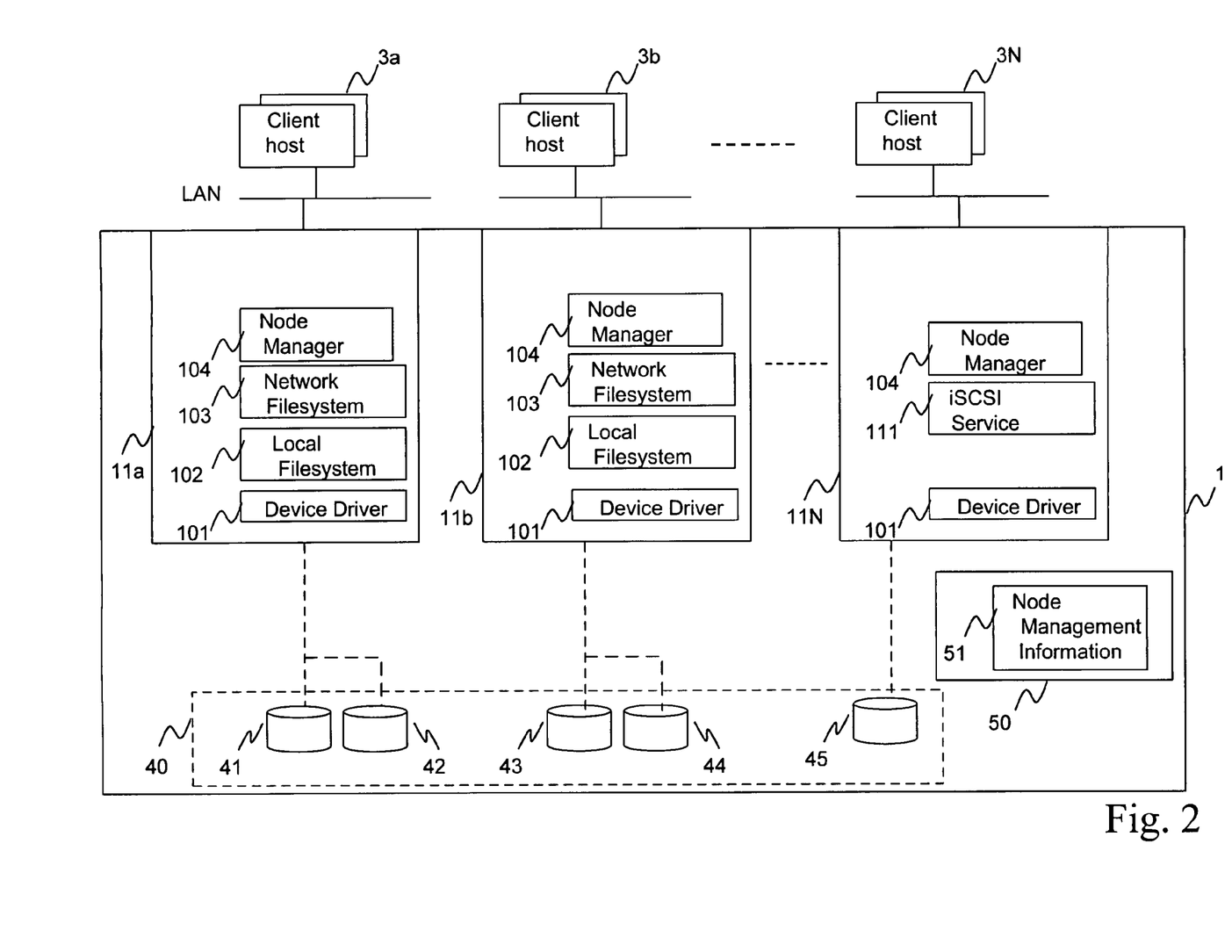
FIG. 2 is a functional block diagram of FIG. 1 showing the functions provided by the elements shown in FIG. 1.

FIG. 2 is a functional representation of the storage system 1 shown in FIG. 1. This figure illustrates the various functional units provided in the storage system 1. In accordance with one embodiment of the storage system 1 communicates with the client hosts 3a to 3N using TCP/IP based protocols, such as NFS, CIFS, or iSCSI. FIG. 2 shows HAs 11a and 11b each is configured to communicate file level request with a client host 3 using a file server type protocol, such as NFS (network file system) or CIFS (common internet file system). HA 11a and 11b include a network file system 103 and a local file system 102. HA 11N is configured to communicate using the iSCSI protocol (Internet SCSI), and is shown with an iSCSI service module 111, a software component for processing iSCSI protocols.

FIG. 2 shows that each HA 11 includes a device driver 101 for communicating with the physical storage units 40. The figure shows that the physical storage units 40 is configured as a plurality of logical volumes 41-45 that are assigned to specific HAs. For example, logical volumes 41 and 42 are assigned to HA 11a. Logical volumes 43 and 44 are assigned to HA 11b. Logical volume 45 is assigned to HA 11N. These assignments are represented by the dashed lines that connect the HAs 11a to 11N to the constituent physical storage units 41-45. This assignment of logical volumes 41-45 to the HAs is accomplished by operation of the disk adapter 31 through a process known as volume mapping. It is noted that volume mapping can assign more than one HA to a logical volume, though FIG. 2 shows each logical volume having been assigned to one HA.

In accordance with the particular embodiment of the present invention shown in FIG. 2, each HA includes a node manager module 104. This is a software component that is used to set and otherwise maintain configuration information for each HA 11, referred to herein as "logical setting information." The logical setting information is stored in a node management table 51 in the shared memory 50. The node manager module 104 in each HA 11 can access the node management table 51 via the internal switch apparatus 20. It can be appreciated that the node management functionality that is provided to each HA 11 by its corresponding node manager module 104, can be implemented in other ways. For example, a common control module might be provided in the storage system 1 which accesses and controls each HA to perform the functions that will be discussed below. Therefore, the function that is performed by each the HAs can be collectively referred to as the node management function.

In addition, the system console 60 can provide access to the node management table 51 to allow a user (e.g., system administrator) to maintain, view, or otherwise access the node management table. In accordance with a particular embodiment of the present invention, the system console 60 can access to the node management table 51 by interacting with one of the node managers 104.

Figure 3:
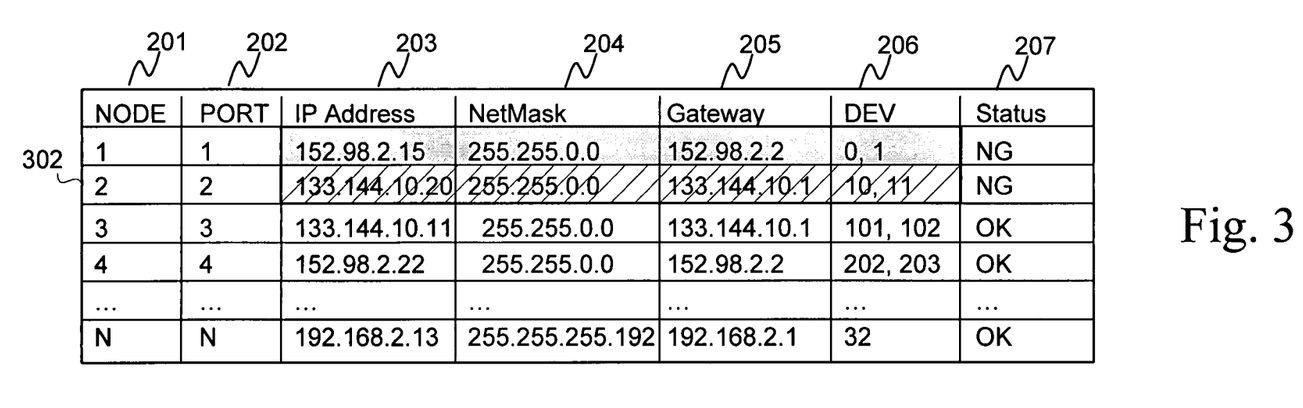
FIG. 3 is a tabular representation of the information comprising the node management table corresponding to the configuration shown in FIG. 1.

FIG. 3 shows in tabular form an illustrative embodiment of the node management table 51. Each row in the node management table 51 corresponds to one of the ports. Each row includes a NODE field 201 which contains information identifying an HA. Thus, each HA contains identification information that identifies that HA. For example, the memory component 13 in an HA may include a non-volatile memory (not shown) that stores that HA's identification information. Information stored in a PORT field 202 is an identifier that uniquely identifies the port from among the other ports. The port identification information can also be stored in the non-volatile memory of each HA. An IP Address field 203 indicates the IP address of the port. The port's IP address is used by the device (e.g., client host, switch, etc.) that is connected to the port, allowing the device to communicate with that port. Typically, configuration information in the device includes the IP address of the port. A Netmask field 204 contains subnet masking bits that are associated with the port's IP address. A Device field 206 contains a list of the one or more logical devices that are assigned to the HA (identified in the NODE field 201) that corresponds to the port.

A Gateway field 205 contains the IP address (hereinafter referred to as the "gateway address") of the router that is connected to the same network where the HA is connected. As will be described below, the IP address of the Gateway field 205 is kept in the table to use for testing the communication of the HA. Instead of the IP address of a router, another IP address of the network element, such as NIS (Network Information Service) servers, may be used for testing the communication. In this case, the IP address of an NIS server may be kept in the table instead of the IP address of the router.

A Status field 207 indicates the communication status between the port and the network. As will be discussed below, this is determined by communicating with a device whose IP address is contained in the Gateway field 205. As discussed above, this can be a device that is connected to the port by a cable (connected device), or a device that is behind a switch apparatus that is connected to the port. An OK communication condition indicates that there is valid data communication between the HA (identified in the NODE field 201) and the device (identified by its router address in the Gateway field 205). An NG (i.e., no good) communication condition indicates that the HA cannot communicate with the device identified in the Gateway field 205. It can be appreciated of course that additional information can be stored in the node management table 51.

Figure 4:
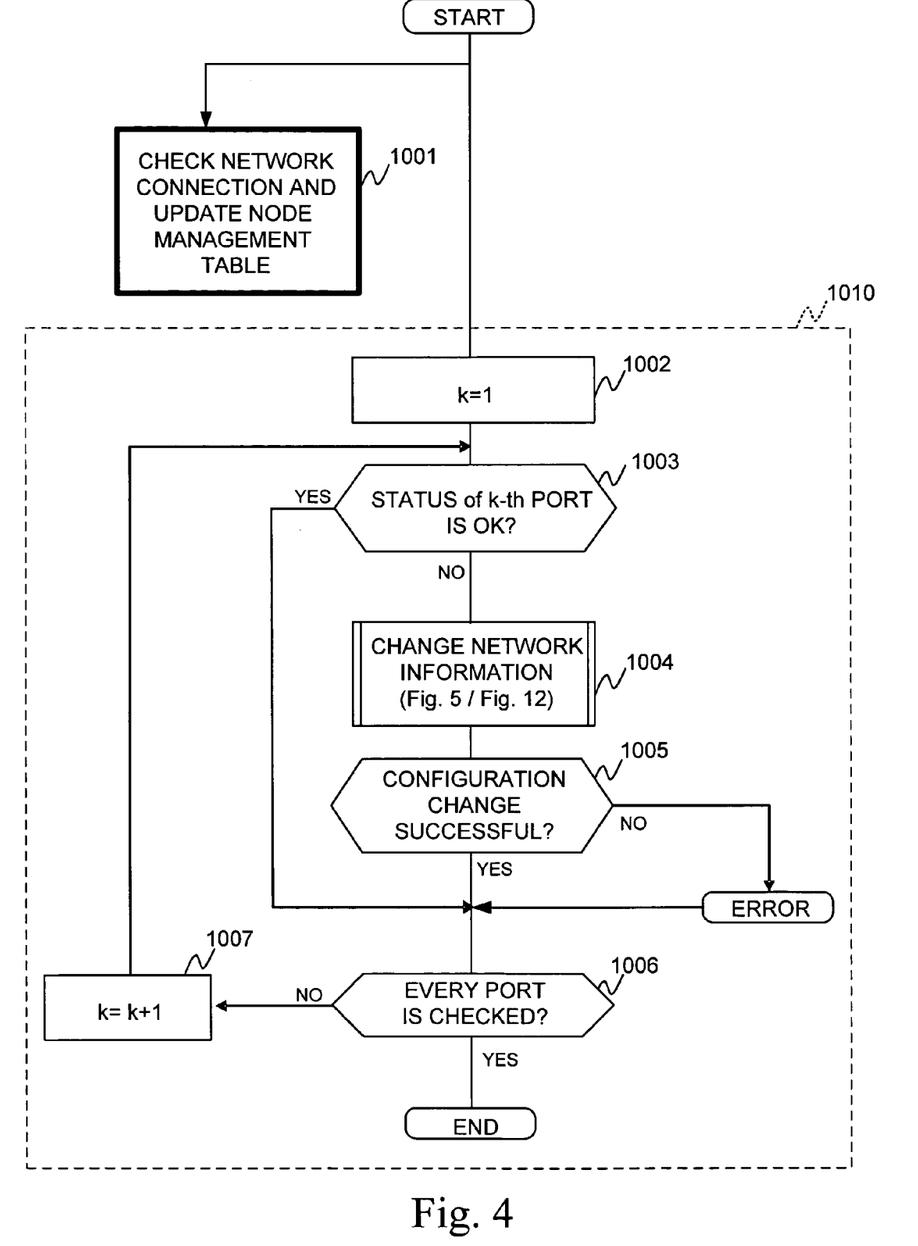
FIGS. 4 and 5 are high level flow charts showing the processing highlights for port reconfiguration according to an embodiment of the present invention.

FIG. 4 highlights the major operations performed in the storage system 1 in accordance with the present invention. The operations shown in the flow chart of FIG. 4 are performed by the node manager modules 104.

In a step 1001, the node manager module 104 in each HA 11 performs a communication test to check the network connection. This step can be periodically performed in an automated fashion, or manually initiated by a user (e.g., administrator). In accordance with one embodiment of the present invention, the node manager module 104 in an HA being tested employs a routine similar to the very well-known "ping" program which uses the ICMP (internet control message protocol) ECHO request message to verify an end-to-end path. Thus, each node manager module 104 accesses its corresponding row in the node management table 51 to obtain its associated gateway address from the Gateway field 205. For example, the HA's identification information can be retrieved (e.g., from non-volatile memory) and matched against the NODE field 201 to locate the HA's corresponding entry in the node management table 51. The Gateway field 205 of the accessed entry is then used as the target address of the "ping" operation. Or, as noted above, a broadcast message can be sent to that target address. Or, some other equivalent communication can be made to the network. Each node manager module 104 performs this communication test, and updates the Status field 207 of its corresponding entry in the node management table 51.

If the HA receives a positive response from the target device (i.e., the network element at the target address), then the corresponding communication status field 207 of the accessed entry is set to OK. If the HA receives a negative response or otherwise times out waiting for a response, then the corresponding Status field 207 is set to NG.

In the context of the present invention, a "positive response" is a response from the target device, indicating that it is indeed the device identified in the Gateway field 205; in other words, the IP address of the target device is the same as the address stored in the Gateway field. A "negative response" can be a NAK or some similar negative indication that the address of the target device is not the address contained in the Gateway field 205. A "negative response" can be the passage of a period time during which no response was received from the target device. A negative response could therefore indicate that the HA's port is connected to a different device, or that the port is not connected to anything (i.e., there is no cable connected to the port).

Continuing with the flow chart of FIG. 4, a processing loop 1010 is performed. It is noted that the communication test (step 1001) can be performed as a background process by each node manager module 104, an independently of each other. The shared memory 50 can be accessed using well-known techniques for concurrently accessing a common resource. Moreover, the communication test can occur independently of the processing loop 1010, as indicated in FIG. 4, by the dual flows from the START node.

The processing loop 1010 can be initiated manually by a user (e.g., via a command from the system console 60). Alternatively, the processing loop 1010 can be performed in automated fashion in a periodic manner, or according to a schedule, or in response to some triggering event (e.g., detection of a cable being disconnected or a cable being connected). As will be appreciated in the discussion which follows, in order to avoid race conditions for accesses to the node management table 51, one of the node manager modules 104 from among the HA's 11 is designated as the "master" node manager module, or simply the master. Furthermore, the master can always be the same node manager module, or alternate (e.g., round-robin fashion) among the node manager modules, or manually determined by a user (e.g., administrator). The master communicates or otherwise signals the other node manager modules 104 to perform according to the steps to be discussed.

Each entry in the node management table 51 is processed, and so a pointer of some form is needed to identify which entry is being processed. Thus, in a step 1002, the master initializes a counter, K, which simply identifies the "current" entry that is being processed. The counter is specific to the particular embodiment of the node management table 51 shown in FIG. 3. A test 1003 is made to ascertain the communication status of the port corresponding to the current entry. This is accomplished by inspecting the Status field 207. An OK communication condition indicates that the last time this field was updated (in step 1001), the HA 11 performed a successful communication test, meaning that communication was made with a device (e.g., client host, switch element, etc.) whose IP address matches the address in the Gateway field 205 of the current entry. With respect to step 1003, if the Status field 207 is OK, then a test 1006 is made whether every entry in the node management table 51 has been checked. Any of a number of conventions can be adopted to determine that the end of the node management table 51 has been reached. A counter can be provided that indicates how many entries are in the node management table 51. The last entry can have a special value (e.g., −1, negative one) to indicate the end. Still other implementations are possible.

Processing of the loop 1010 completes if the end of the node management table 51 is reached. Otherwise, the counter K is incremented in a step 1007, and processing of the loop 1010 continues at step 1002.

Returning to step 1003, if the Status field 207 is NG, then one explanation is the port corresponding to the current entry has nothing connected to it. Another explanation is the device is disabled, or otherwise inoperative. Still another explanation is the device has an IP address different from the address contained in the Gateway field 205 of the current entry. A crossed cable would produce such a result (FIG. 6). Thus, with respect to step 1003, if the Status field 207 is NG, then an attempt is made to determine if a cross-connected situation has caused the NG status, in a step 1004 (FIG. 5).

Figure 5:
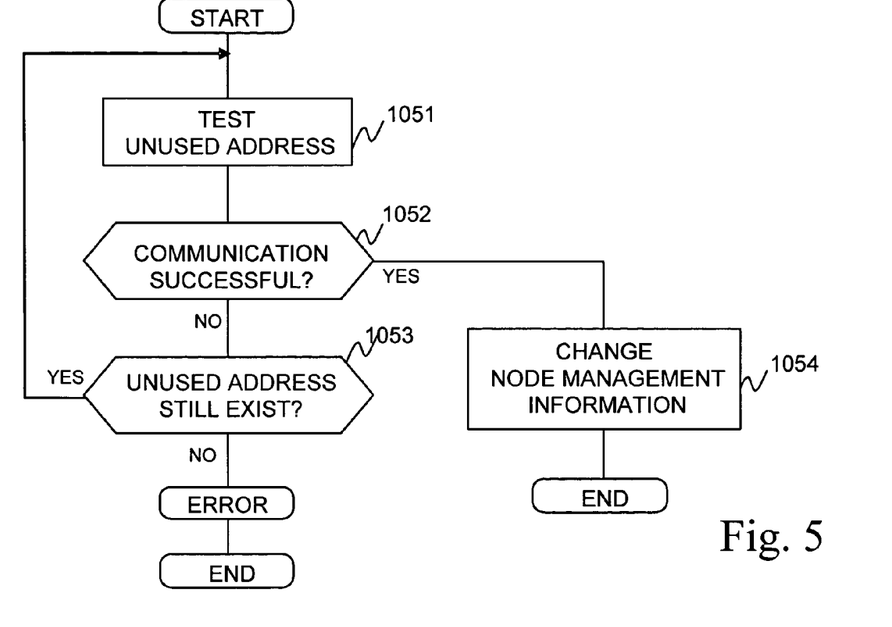

Processing of FIG. 5 is performed by one of the node manager modules 104. In particular, the node manager module 104 of the HA that corresponds to the current entry is "signaled" to perform processing as shown in FIG. 5. The node manager module (target node manager module) that needs to be signaled is identified by the HA identifier information in the NODE field 201 of the current entry. For example, if the current entry in the node management table 51 is the second entry 302, then the node manager in the HA 11b would be signaled. It can be appreciated that a suitable signaling technique can be readily implemented which allows the master to signal the target node manager module (target). When the target is signaled, the target performs the processing of FIG. 5. During processing in FIG. 5, the node management table 51 might be updated during the processing by the target. As will become clear from the discussion of FIG. 5, the processing must complete before another target is signaled. Consequently, the master should wait until one target has completed processing before signaling another target. If the master does not wait and instead signals additional targets, then corruption of the node management table 51 could result. Consequently, step 1004 further includes the master entering a wait state after signaling the target.

Referring then to FIG. 5, the target node manager module performs a communication test using an unused address, step 1051. The target searches for a "candidate" entry in the node management table 51 whose Status field 207 is NG, other than the entry (target entry) that corresponds to the target node manager module. The target node manager module then performs a communication test as discussed above, using the gateway address in the Gateway field 205 of the candidate entry. For example, a "ping" might be communicated through the port of the HA within which the target node manager module is executing, communicating the ping to the device at the gateway address. This gateway address is considered "unused" because, as indicated in the Status field 207, the HA that corresponds to the candidate entry cannot communicate through its port using that gateway address, hence it has since been (or become) "unused."

Figure 3A:
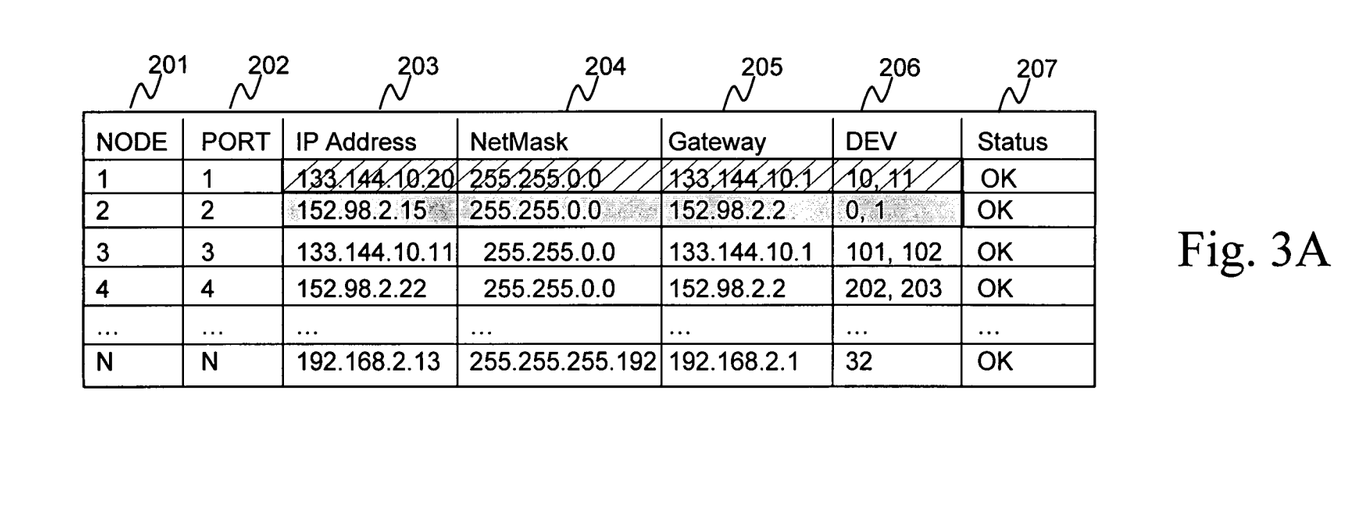
FIG. 3A is a tabular representation of a modified node management table.

A determination is made, in a step 1052, whether the communication produced a positive result. If so, then the node management table 51 is updated in a step 1054 to reflect that the target port. This action involves exchanging some of the information contained in the candidate entry with the corresponding information contained in the target entry. In particular, the IP Address field 203 and the Netmask field 204 are exchanged, as are the Gateway field 205 and the Device field 206. This is shown in FIGS. 3 and 3A. Suppose the target entry is node 1, and the candidate entry is node 2. The update step 1054 produces the updated node management table 51 as shown in FIG. 3A. The fields of the target entry (gray) and the fields of the candidate entry (hashed) are swapped. The Status field 207 of the target entry is set to OK. Following step 1054, the target can "signal" the waiting master with an indication that the HA in which the target is executing is now able to communicate with a device.

Returning to the test in step 1052, if the communication produces a negative result, then an attempt is made to perform a communication with the next unused address. Thus, a test 1053 first is performed to determine if there are any more unused addresses. For example, the target node manager module might keep a running list of entries whose Status fields 207 contain NG that have been tested. If there are no more entries having a Status field 207 of NG that have been tested, then the target can "signal" the waiting master with an indication that the HA in which the target is executing remains unable to communicate with a device.

Returning to FIG. 4, the target will signal the master, which is in a wait state in step 1004, with a success or a non-success indication. A determination is made in a step 1005 whether the target completed successfully. If not, then error handling is performed. This might include making a record in a log file, or alerting a use (e.g., administrator), or the like. Processing then continues to a determination step 1006.

If the target completed with a successful outcome, then processing proceeds to the determination step 1006, where a check is made whether all the ports in the node management table 51 have been considered. If there is another port, then the counter is incremented to identify the next port and control is returned to the top of the loop at step 1003. If there are no more ports to consider, then processing of the loop completes.

Figures 6A, 6B, 6C, 7A, 7B:
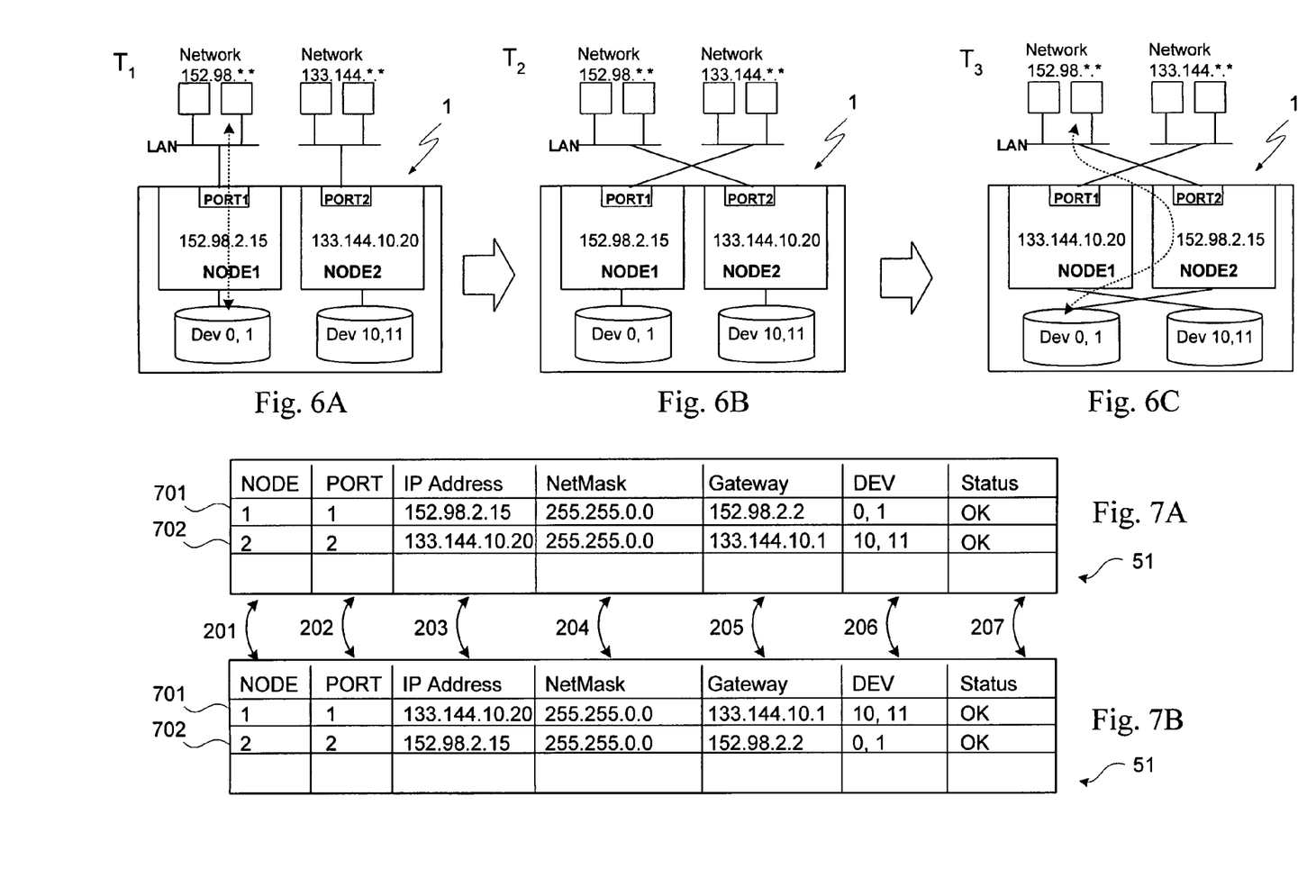
FIGS. 6A-6C illustrate an example of port reconfiguration in accordance with the present invention.
FIGS. 7A and 7B show changes to the node management table that correspond to the sequence of FIGS. 6A-6C.

FIGS. 6A-6C illustrate the process shown in FIGS. 4 and 5. The configuration shown in FIG. 6A represents an initial state (at a time $T_1$) of some of the connections to the storage system 1. Referring to the entry in the node management table shown in FIG. 7A, it can be seen that a first entry 701 in the table corresponds to an HA that is designated as node 1. It has an IP address of 152.98.2.15, and includes a port identified as port 1. The Gateway field 207 contains an IP address (152.98.2.2) of a router in the network (identified in FIG. 6A by the generic address 152.98.*.*) to which the port is connected. The logical devices associated with the entry 701 are Dev0 and Dev1. A second entry 702, likewise, corresponds to an HA that is designated as node 2. It has an IP address of 133.144.10.20, and includes a port identified as port 2. Its Gateway field 207 contains an IP address (133.144.10.1) of a router in the network (identified in FIG. 6A by the generic address 133.144.*.*) to which the port is connected. The logical devices associated with the entry 702 are Dev10 and Dev11. FIG. 6A shows cable connections between each port and its corresponding network at time $T_1$.

FIG. 6B shows a situation at a subsequent time $T_2$ in which the cables have been crossed, perhaps accidentally or by design. The consequence of the crossed cables is that neither port 1 nor port 2 is able to communicate with either network.

However, after processing according to the flow shown in FIGS. 4 and 5 completes (at a time $T_3$), the node management table 51 is reconfigured so that communication with each network (i.e., 152.98.*.* and 133.144.*.*) can resume. FIG. 7B shows the reconfigured node management table. FIG. 6C illustrates the reconfiguration that is performed in the HAs. Thus, the HA corresponding to entry 701 (identified as node 1) is now configured with an IP address of 133.144.10.20 (IP Address field 203). It's Gateway field 205 contains the IP address 133.144.10.1. Note that the Dev field 206 references logical volumes DEV10 and DEV11, indicating that the HA is now "connected" to these logical volumes. The volume mapping ensures that the crossed ports remain associated with the logical volumes the point of view of the client hosts (as shown by the dashed lines in FIGS. 6A and 6C). As noted above, volume mapping is known, and the details for mapping logical volumes to an HA depends on the specific implementation of the storage system.

Figure 8:
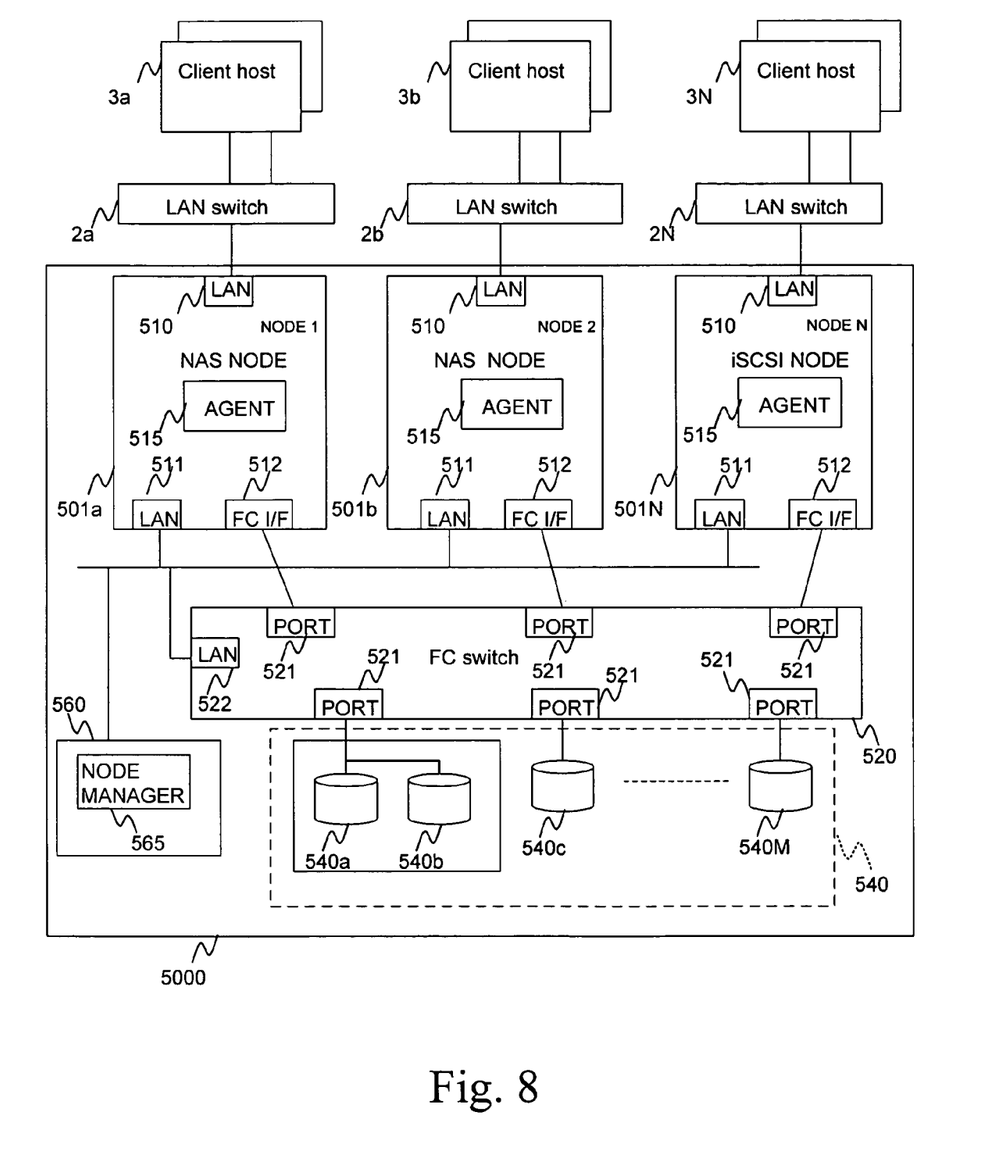
FIG. 8 is a block diagram showing a configuration of a storage system to which another embodiment of the present invention is applied.

FIG. 8 shows another illustrative embodiment of the present invention. A storage system 5000 comprises a plurality of nodes 501a to 501N (generically referenced as 501). Storage is provided via a plurality of disk units 540a to 540M (generically referenced as 540). A fibre channel switch 520 (or any other suitable fabric switch) provides a selectable data connections between the drive units 540a-540M and the nodes 501a to 501N. A node manager module 565 provides functionality similar to system console 60 in FIG. 1. The node manager module 565 can be a software module that executes on a management host processor 560.

Each node 501 serves a similar functionality as the HAs 11 of FIG. 1. Each node 501 can be implemented on a computer system such as a PC (personal computer) based system, running a suitable OS (operating system) such as UNIX. A local disk drive(s) (not shown) can be provided in each node, to store locally accessed programs and information. The nodes 501 can be configured to provide a variety of common I/O interfaces to the client hosts 3a. For example, node 501a and node 501b each is configured as a NAS (network attached storage) device, and communicates with hosts systems 3 according to the NFS protocol, or the CIFS protocol for file-level I/O. The node 501N is configured as a SAN (storage area network) device, using the iSCSI protocol for block-level I/O.

Each node 501 includes a first LAN interface port 510 and a second LAN interface port 511, for data communication. The first LAN interface port 510 is used for data communication with an external device (relative to the storage system); e.g., client hosts 3a to 3N. The second LAN interface port 511 is used for data communication with the node manager module 565 over an appropriate internal communication channel to a suitably configured port (not shown) provided on the management host processor 560. A fibre channel interface port 512 provides for suitable data communication with the fibre channel switch 520. Each node 501 further includes an agent module 515 which provides the functionality of the node manager 104 shown in FIG. 2. Each node 501 stores its own configuration information (e.g., on a local disk drive or somewhere on the disk units 540) such as its LAN's IP address.

The fibre channel switch 520 comprises a plurality of ports 521. The second LAN 511 of each node 501 is connected to one of the ports 521. The disk units 540 likewise are connected to one or more ports 521. The fibre channel switch provides a selectable data path between the nodes 501 and the disk units 540. A LAN port 522 is provided for connection to the internal communication channel. This allows the fibre channel switch 520 to be accessed by the management host processor 560.

The disk units 540 can be individual physical drives 540a-540M that are individually accessed, or are pooled and partitioned into one or more logical volumes. The disk units 540 can be a single physical drive that is partitioned into logical volumes. Still other configurations are possible. In accordance with this embodiment, each disk unit 540a-540M is uniquely identified by a WWN (world wide name) and an LUN (logical unit number).

Figure 9:
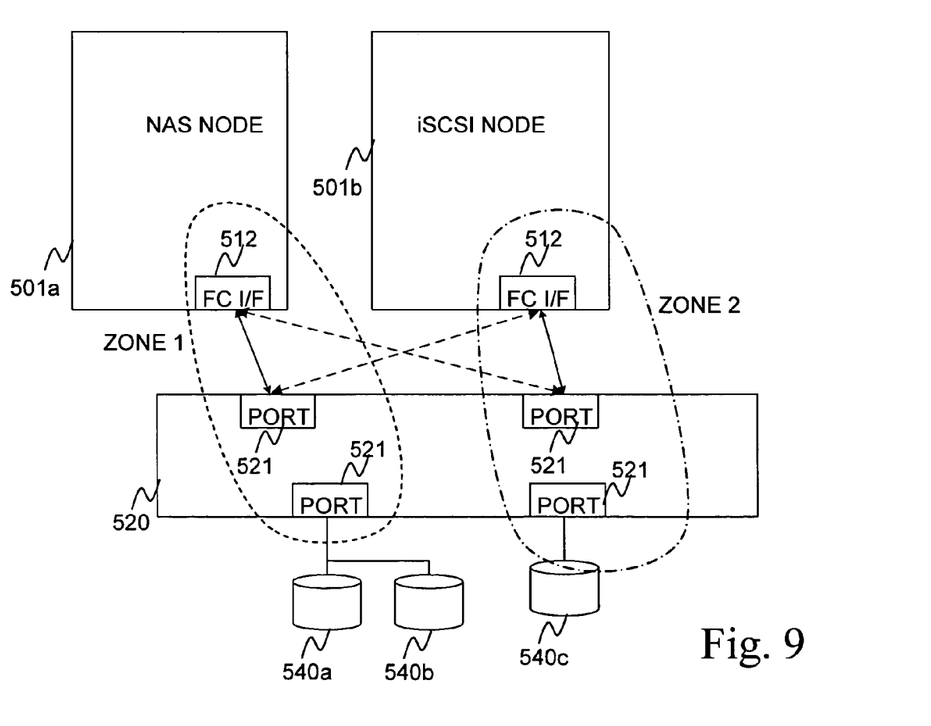
FIG. 9 illustrates zoning in a fibre channel switch.

FIG. 9 illustrates the notion of "zoning" in the fibre channel switch 520. Zoning is a function provided by the fibre channel switch 520 that allows segregation of a node by physical port, name, or address. In FIG. 9, the node 501a and disk units 540a and 540b belong to a zone named "ZONE 1". Similarly, the node 501b and disk unit 540c belong a zone named "ZONE 2". By creating zones in the Fibre Channel switch 520, the storage system 5000 performs functionality similar to device mapping. This aspect of the fibre channel will be discussed further below.

Figure 10:
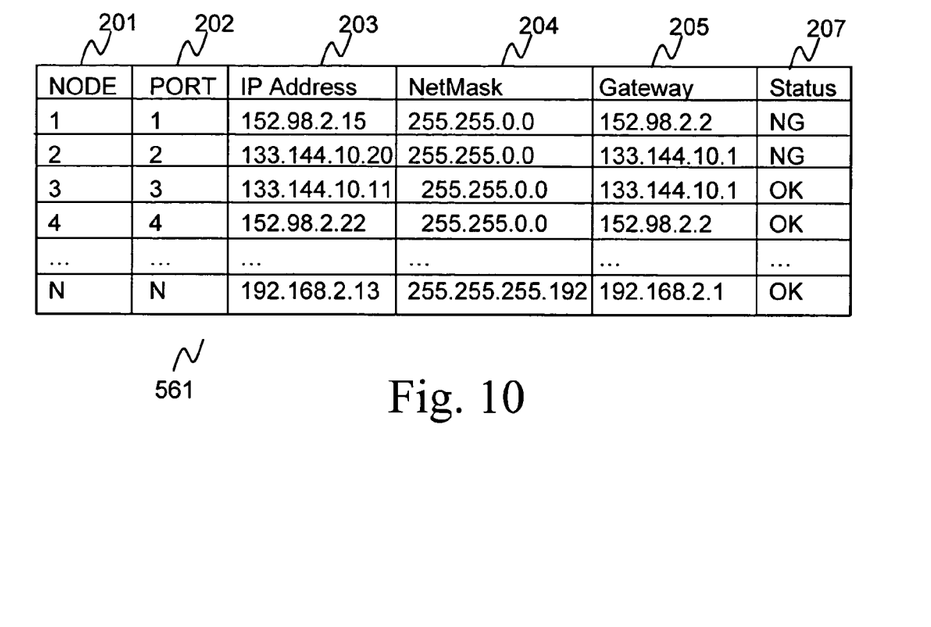
FIGS. 10 and 11 are a tabular representations of the information comprising the node management table corresponding to the configuration shown in FIG. 8.
Figure 11:
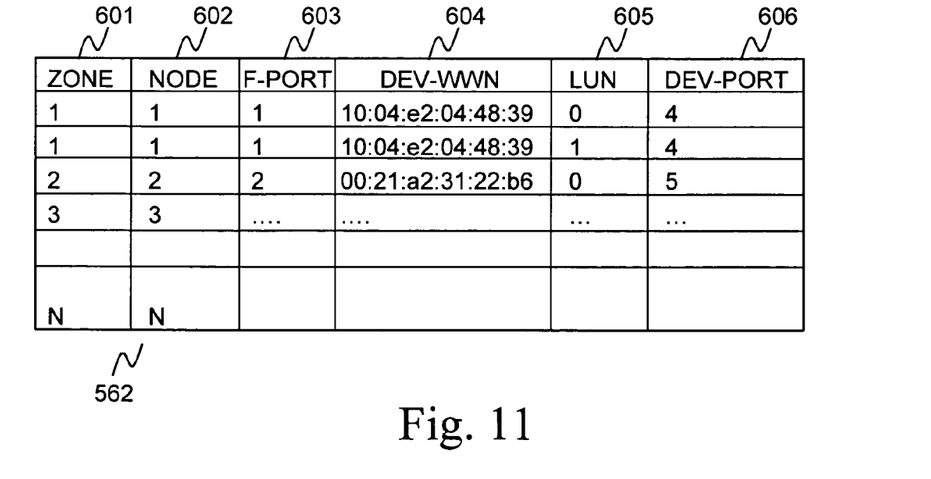

FIGS. 10 and 11 show the node management information appropriate for the embodiment of the present invention shown in FIG. 8. The node management information is managed by the node manager module 565, and can be stored in local storage provided in the management host processor 560. The node management information is shown in tabular form in two tables, the node management table 561 of FIG. 10 and the storage management table 562 of FIG. 11. The node management table 561 shown in FIG. 10 is similar to the node management table 51. The fields in the node management table 561 contain the same information as in the corresponding fields in the node management table 51. The Device field 206 (FIG. 3) is not present in the node management table 561. Instead, the storage management table 562 is used to manage the information relating to the disk units 540.

FIG. 11 shows the storage management table 562. The storage management information table 562 is used for storing the zoning information of the fibre channel switch 520. Each row corresponds to a node 501 and contains storage-related information about the corresponding node. A ZONE field 601 stores information that identifies the zone to which the node belongs. A NODE field 602 contains information that identifies the node. An F-PORT field 603 contains information that identifies the port 521 in the fibre channel switch 520 to which the node (identified in the NODE field 602) is connected. Note that the connection is to the fibre channel interface port 512 of the node. A DEV-WWN field 604 contains the WWN of the disk unit 540 that belongs to the zone identified in the ZONE field 601. Likewise, the LUN field 605 identifies the logical unit number of the disk unit. A DEV-PORT field 606 shows the identification number of each port 521 to which the disk 540 identified in the DEV-WWN field 604 and the LUN field 605 is connected.

Referring to FIGS. 4 and 8, operations performed in the storage system 5000 according to the present invention are essentially similar to the steps shown in the figure. The step 1001 is performed by the node manager 565, and can be initiated manually or in an automated fashion. The node manager 565 communicates with each agent module 515 to perform the communication test of step 1001. In the embodiment shown in FIG. 8, each agent module 515 communicates its communication test result (e.g., OK, NG) back to the node manager 565. The node manager can then update node management information (e.g., the tables shown in FIGS. 10 and 11). The processing loop 1010 in FIG. 4 is then performed as described above. An agent module 515 (target) that is associated with a port (510) which has NG in its corresponding Status field 207 in the node management table 561 is signaled by the node manager 565. The processing in step 1004 for the target agent module then proceeds according to the flow chart shown in FIG. 12.

Figure 12:
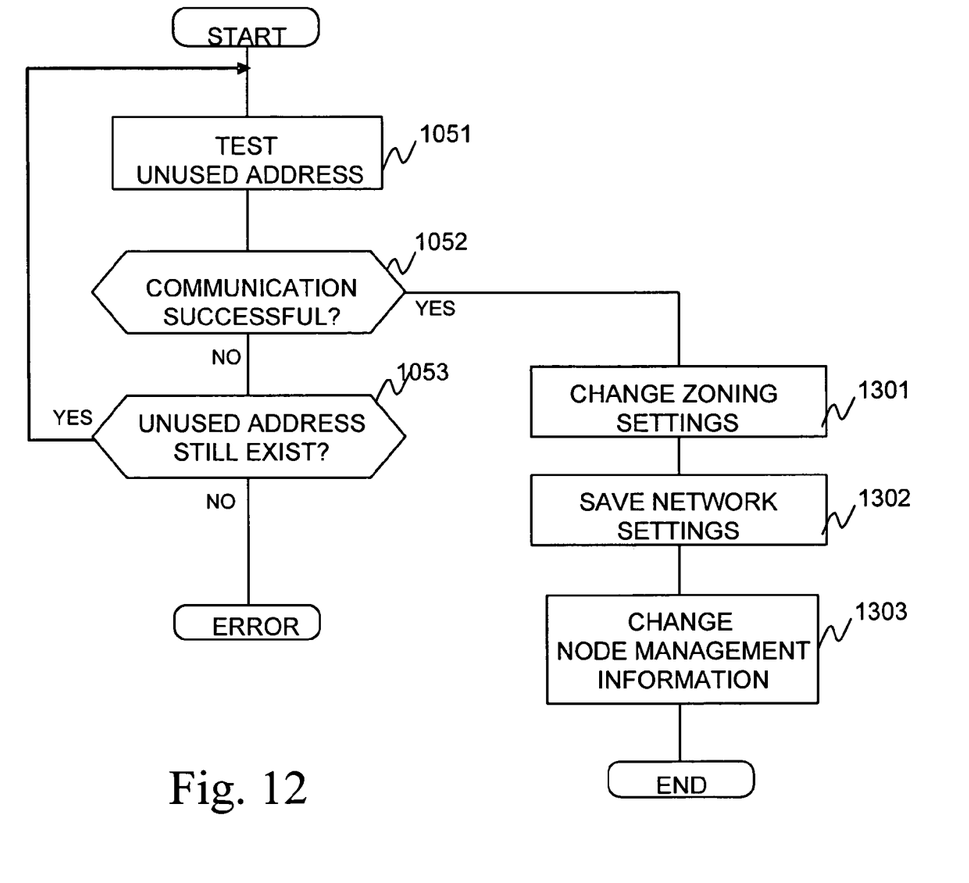
FIG. 12 is a high level flow chart showing the processing highlights for port reconfiguration according to the embodiment of the present invention shown in FIG. 8.

Referring to FIG. 12, the steps 1051 to 1053 performed by the target agent module are substantially the same as the steps 1051 to 1053 described in FIG. 5. Thus, the target agent module performs a communication test using an unused address, step 1051. The target searches for a "candidate" entry in the node management table 561 whose Status field 207 is NG, other than the entry (target entry) that corresponds to the target agent module. The target agent module then performs a communication test as discussed above, using the gateway address in the Gateway field 205 of the candidate entry.

A determination is made, in a step 1052, whether the communication produced a positive result or a negative result. If the communication produces a negative result, then an attempt is made to perform a communication with the next unused address. Thus, a test 1053 first is performed to determine if there are any more unused addresses. If there are no more entries having a Status field 207 of NG that have been tested, then the target agent module can "signal" the node manager module 565 with an indication that the HA in which the target agent module is executing remains unable to communicate with a device.

Returning to step 1052, if the communication produced a positive result, then a network has been discovered (discovered network) that is connected to the port associated with the node on which the target agent module is executing. The node management table 561 is updated in a step 1301 to perform a re-zoning operation so that port is associated with the logical drives of the discovered network. This is accomplished by changing the zone settings in the fibre channel switch 520, and is typically performed by node manager 565 (e.g., via an appropriate signaling convention by the target agent module to the node manager).

Referring to FIG. 9, if the port connections were crossed (as indicated by the dashed lines), then Zone 1 would have to be reconfigured to include only the disk unit 540c and Zone 2 would have to be reconfigured to include only the disk units 540a and 540b. The re-zoning ensures that the crossed ports remain associated with the disk units from the point of view of the client hosts.

Processing then continues with a step 1302 in which the node manager 565 communicates with the target agent module to instruct the agent module to save the network setting information. Then in a step 1303, the node manager 565 makes an appropriate change to the node management information table 561, in the manner as discussed in step 1054 of FIG. 5.

What is claimed is:

1. In a storage system comprising a first storage area and a second storage area, a method of managing access to the first and second storage areas comprising:

at a time T, performing communication between a first port of the storage system and at least one first device over a first network, the first port configured to perform I/O operations with the first storage area to service I/O requests received from the at least one first device, wherein the first port is associated with first configuration information;

at time T, performing communication between a second port of the storage system and at least one second device over a second network, the second port configured to perform I/O operations with the second storage area to service I/O requests received from the at least one second device, wherein the second port is associated with second configuration information, wherein the first port is not in data communication with the second device associated with the second storage area and the second port is not in data communication with the first device associated with the first storage area; and subsequent to time T, performing:

a first step of determining that the first port is not in data communication with the first device associated with the first storage area;

a second step of determining that the second port is not in data communication with the second device associated with the second storage area;

a third step of determining that there is data communication between the first port and the second device and in response thereto, reconfiguring the first port using the second configuration information so that the first port performs I/O operations with the second storage area in response to receiving I/O requests from the at least one second device; and a fourth step of determining that there is data communication between the second port and the first device and in response thereto, reconfiguring the second port using the first configuration information so that the second port performs I/O operations with the first storage area in response to receiving I/O requests from the at least one first device, wherein the first step of determining includes performing one or more communication tests between the first port and the first device, wherein the second step of determining includes performing one or more communication tests between the second port and the second device.

2. The method of claim 1 wherein the communication tests in the first step of determining and in the second step of determining are performed periodically in automated fashion.

3. The method of claim 1 wherein the step of associating is a volume mapping operation.

4. The method of claim 1 wherein the step of associating is a zoning operation in a fibre switch apparatus.

5. The method of claim 1 wherein first step of determining is performed with the first port configured with the first configuration information, and the second step of determining is performed with the second port configured with the second configuration information.

6. The method of claim 1 wherein the step of associating further comprises assigning the first configuration information to the second port.

7. The method of claim 1 wherein the first and second configuration information each includes a port IP (internet protocol) address.

8. The method of claim 1 wherein the first configuration information further includes a device IP (internet protocol) address of one of the first devices, wherein the second configuration information further includes a device IP (internet protocol) address of one of the second devices.

9. In a storage system comprising a plurality of ports, each port being associated with an area of storage in the storage system, each port in data communication over a corresponding network, a method of managing the area of storage comprising:

at a time T, performing communication between a first port of the storage system and at least one first device over a first network, the first port configured to perform I/O operations with a first storage area to service I/O requests received from the at least one first device, wherein the first port is associated with first configuration information;

at time T, performing communication between a second port of the storage system and at least one second device over a second network, the second port configured to perform I/O operations with a second storage area to service I/O requests received from the at least one second device, wherein the second port is associated with second configuration information, wherein the first port is not in data communication with the second device associated with the second storage area and the second port is not in data communication with the first device associated with the first storage area; and subsequent to time T, performing one or more communication tests at each port, including:

communicating a message to at least one device associated with the area of storage, the device being accessible over its corresponding network, and determining whether the communicating resulted in an OK communication condition or a not-OK communication condition; and for each target port that is associated with the not-OK communication condition, performing steps of:

communicating a message from the target port to at least one device associated with the area of storage, the device being accessible over a network that corresponds to a candidate port, wherein the candidate port is a port that is associated with the not-OK communication condition of the target port, and if the step of communicating results in an OK communication condition, then associating the area of storage of the candidate port with the target port, wherein the first port is configured to perform I/O operations with the second storage area using the second configuration information and the second port is configured to perform I/O operations with the first storage area using the first configuration information.

10. The method of claim 9 wherein the step of associating includes performing a volume mapping operation.

11. The method of claim 9 wherein the step of associating includes performing a zoning operation.

12. The method of claim 9 further comprising for each target port that is associated with a not-OK communication condition configuring the target port with communication configuration information that is associated with the candidate port, prior to performing the step of communicating.

13. The method of claim 9 wherein each port is associated with communication configuration information, wherein the step of performing one or more communication tests is performed with each port configured with it associated communication configuration information, the method further comprising for each target port that is associated with a not-OK communication condition configuring the target port with communication configuration information that is associated with the candidate port, prior to performing the step of communicating.

14. The method of claim 13 wherein the step of associating further includes exchanging the communication configuration information of the target port with the communication configuration information of the candidate port.

15. The method of claim 13 wherein the communication configuration information comprises a port IP address and a device IP address.

16. In a storage device comprising a plurality of ports, each port being associated with a device, each device having a device address for communication therewith and being associated with a storage volume in the storage device, a method for operating said storage device comprising:
at a time T, performing communication between a first port of the storage device and at least one first device over a first network, the first port as configured to perform I/O operations with a first storage area in response to receiving I/O requests from the at least one first device, wherein the first port is associated with first configuration information;
at time T, performing communication between a second port of the storage device and at least one second device over a second network, the second port configured to perform with a second storage area in response to receiving I/O requests from the at least one second device, wherein the second port is associated with second configuration information, wherein the first port is not in data communication with the second device associated with the second storage area and the second port is not in data communication with the first device associated with the first storage area; and
subsequent to time T, determining a communication state for each of the ports, the communication state indicating one of at least a first condition and a second condition of the port, the first condition indicating that there is a data communication path between a port and its associated device, the second condition indicating an absence of a data communication path between a port and its associated device, wherein each port is further associated with the storage volume in the storage device; and
for the first port whose communication state indicates the second condition:
identifying, as a candidate port, another port whose communication state indicates the second condition;
performing a communication attempt from the first port using the device address of the device associated with the candidate port;
if the communication attempt is successful, then associating the first port with the device of the candidate port and changing the communication state of the first port to indicate the first condition, and further associating the first port with the storage volume of the candidate port, wherein the first port is configured to perform I/O operations with the second storage area using the second configuration information and the second port is configured to perform I/O operations with the first storage area using the first configuration information; and
if the communication is not successful, then repeating the steps of identifying and performing.

17. The method of claim 16 wherein the step of determining includes performing a PING operation from each port to its associated device.

18. The method of claim 16 wherein the step of determining includes performing a broadcast operation from each port to its associated device.

19. A storage system comprising:
a plurality of storage areas;
a plurality of ports, each port of the storage system being associated with one of the storage areas, each port being associated with a network that is different from that of the other ports; and
a node management module configured to perform steps of:
at a time T, performing communication between a first port of the storage system and at least one first device over a first network, the first port configured to perform I/O operations with a first storage area in response to receiving I/O requests from the at least one first device, wherein the first port is associated with first configuration information;
at time T, performing communication between a second port of the storage system and at least one second device over a second network, the second port configured to perform I/O operations with a second storage area in response to receiving I/O requests from the at least one second device, wherein the second port is associated with second configuration information, wherein the first port is not in data communication with the second device associated with the second storage area and the second port is not in data communication with the first device associated with the first storage area;
subsequent to time T, communicating a message, from each of the ports, to a device associated with one of the storage areas, the device being accessible from its associated network, the communicating producing either an OK result or a not-OK result;
identifying which of the ports have an OK result and which of the ports have a not-OK result; and
for each first port that is associated with a not-OK result, performing steps of:
identifying a candidate port, the candidate port being associated with a not-OK result;
communicating a message, from the first port, to a device over the network that is associated with the candidate port and further associated with one of the storage areas; and
if the communicating produces an OK result, then associating the network of the candidate port with the first port and associating the area of storage of the candidate port with the first port, wherein the first port is configured to perform I/O operations with the second storage area using the second configuration information and the second port is configured to perform I/O operations with the first storage area using the first configuration information.

20. The storage system of claim 19 further comprising configuration information for each port, wherein the node management functionality further performs a step of configuring the first port using configuration information of the candidate port; and wherein the step of associating the network of the candidate port with the first port is a step of assigning the configuration information of the candidate port to the first port.

21. The storage system of claim 20 wherein the node management functionality further performs a step of assigning configuration information of the first port to the candidate port, whereby the configuration information of the first port and of the candidate port are swapped.

22. The storage system of claim 20 wherein the configuration information includes a port IP address that identifies the port associated with the configuration information and a device IP address.

* * * * *